(12) United States Patent
Li

(10) Patent No.: US 8,011,820 B2
(45) Date of Patent: Sep. 6, 2011

(54) WIRELESS COMMUNICATION DEVICE AND LIGHT GUIDE EMPLOYED THEREIN

(75) Inventor: Jiunn-Her Li, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 405 days.

(21) Appl. No.: 12/402,473

(22) Filed: Mar. 11, 2009

(65) Prior Publication Data

US 2010/0014870 A1  Jan. 21, 2010

(30) Foreign Application Priority Data

Jul. 16, 2008 (CN) .......................... 2008 1 0302759

(51) Int. Cl.
*F21V 7/04* (2006.01)

(52) U.S. Cl. ........ 362/616; 362/227; 362/253; 362/615; 362/628; 385/50

(58) Field of Classification Search ........ 362/97.1–97.2, 362/223, 225, 227, 253, 268, 311.01, 311.06, 362/511, 615–616, 628; 385/50
See application file for complete search history.

(56) References Cited

FOREIGN PATENT DOCUMENTS

| CN | 2601455 Y | 1/2004 |
|---|---|---|
| CN | 2768028 Y | 3/2006 |

*Primary Examiner* — Stephen F Husar
*Assistant Examiner* — Meghan Dunwiddie
(74) *Attorney, Agent, or Firm* — Altis Law Group, Inc.

(57) ABSTRACT

A wireless communication device includes a plurality of light sources and a light guide including a light guiding element and a light shielding element. The light guiding element includes a plurality of guiding portions. Each guiding portion includes an expander having a first end corresponding to a respective one of the light sources and a second end opposite to the first end. The second ends of the expanders collectively form a continuous end surface. At least one cavity is defined between each two neighboring guiding portions. The light shielding element includes at least one shielding portion received in the at least one cavity to prevent light interference between the plurality of guiding portions.

14 Claims, 6 Drawing Sheets

WIRELESS COMMUNICATION DEVICE AND LIGHT GUIDE EMPLOYED THEREIN

BACKGROUND

1. Technical Field

The disclosure relates to wireless communication, and specifically, to a wireless communication device and a light guide used thereby.

2. Description of Related Art

A wireless communication device may employ an antenna to transceive signals. Signal strength of the antenna may be outputted using a plurality of signal lamps disposed on a printed circuit board (PCB) of the wireless communication device. A plurality of light guides disposed in the wireless communication device convey the light from the signal lamps to an outer surface of the wireless communication device, thereby a plurality display areas being formed on the outer surface for user reference.

However, in such a wireless communication device, each display area on the outer surface thereof is separated from others, displaying an individual signal lamp's state.

DETAILED DESCRIPTION OF EMBODIMENTS

Figure 1:
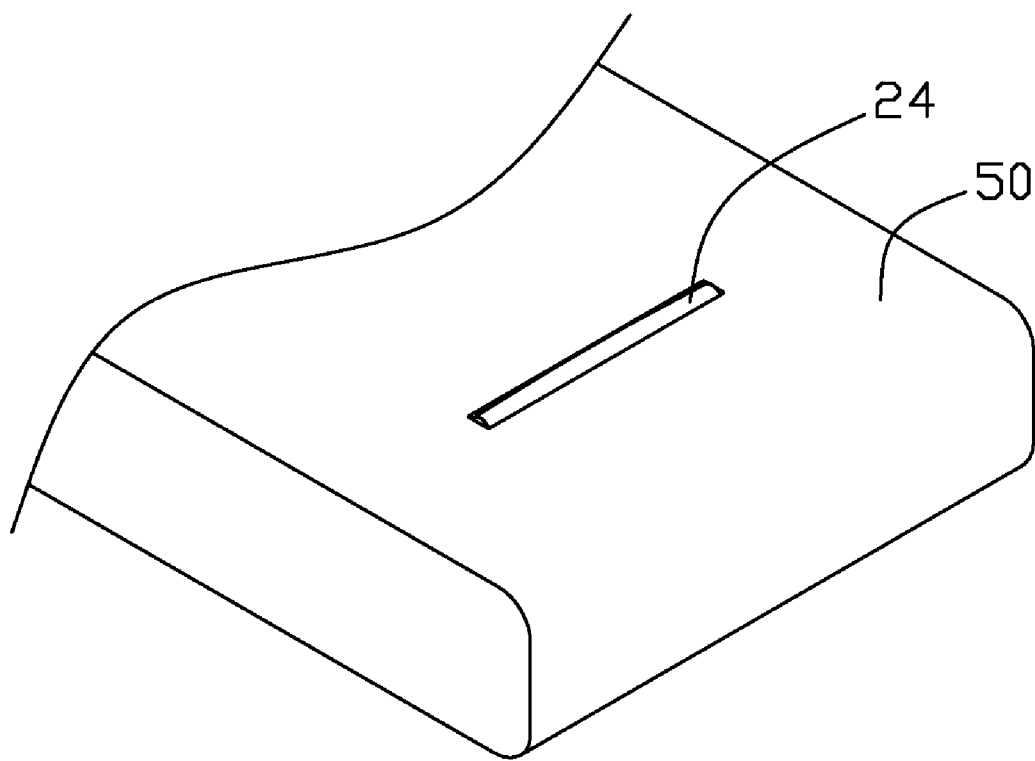
FIG. 1 is a perspective view of a wireless communication device in accordance with the disclosure.
Figure 2:
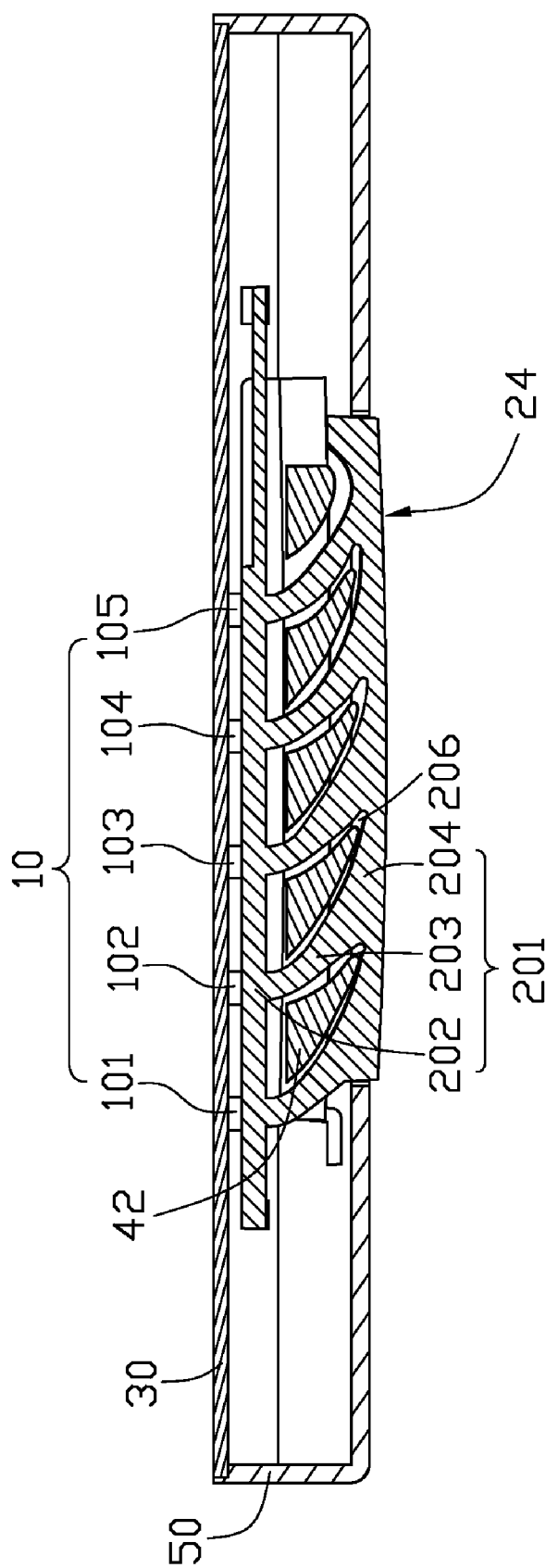
FIG. 2 is a cross section of the wireless communication device of FIG. 1.
Figure 3:
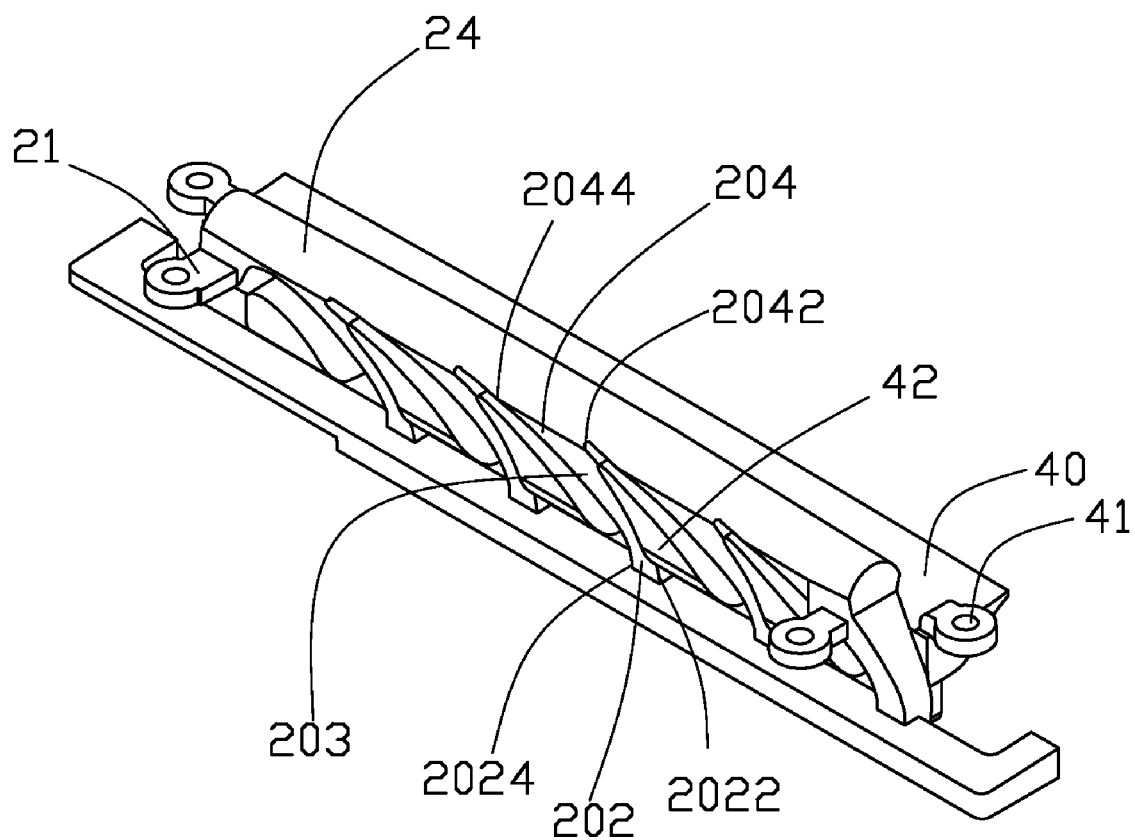
FIG. 3 is a perspective view of light guide of the disclosure, applied in the wireless communication device of FIG. 1.
Figure 4:
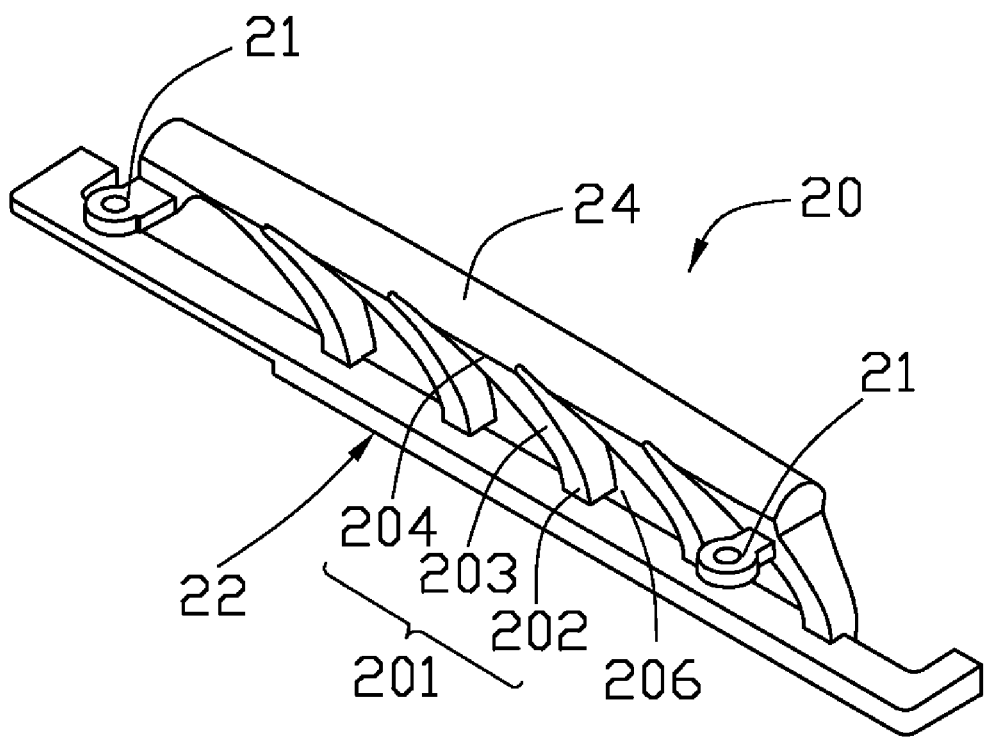
FIG. 4 is a perspective view of light guiding element of the light guide of FIG. 3.
Figure 5:
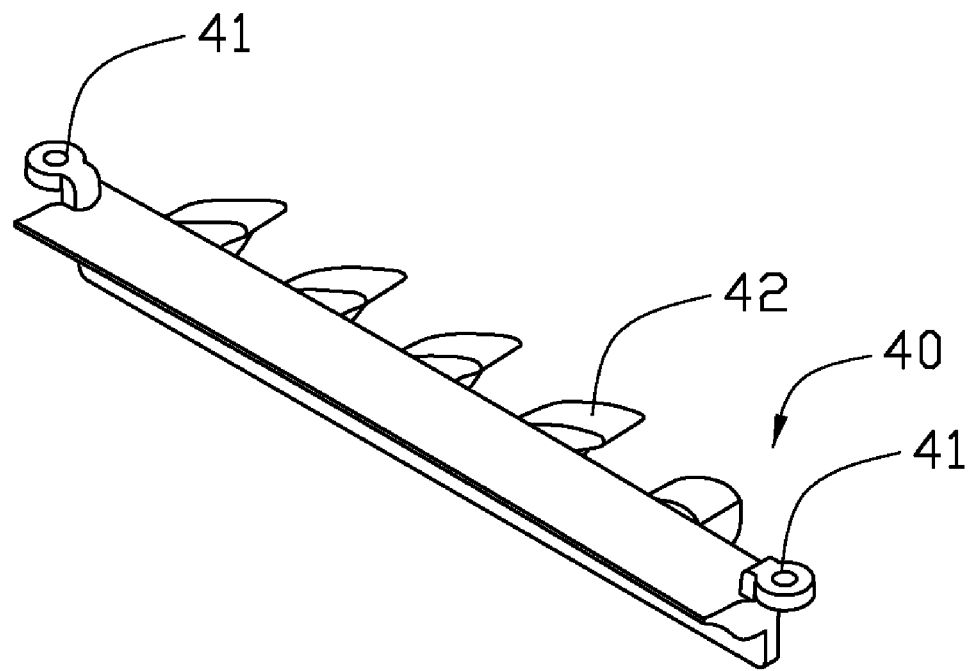
FIG. 5 is a perspective view of light shielding element of the light guide of FIG. 3.

Referring to FIG. 1, a perspective view of a wireless communication device 50 in accordance with the present disclosure is shown. The wireless communication device 50 includes a light guide used for conveying light from a plurality of light sources to an outer surface of the wireless communication device 50. The light is presented in a continuous display on a continuous end surface 24 of the light guide to indicate the signal strength received by an antenna of the wireless communication device 50.

Referring to FIG. 2-FIG. 5, the wireless communication device 50 comprises a plurality of light sources 10 and a light guide. The light guide comprises a light guiding element 20 and a light shielding element 40. The light sources 10, such as light emitting diodes (LEDS) 101, 102, 103, 104, 105 are located on a printed circuit board (PCB) 30 fixed in the wireless communication device 50. The number of lit LEDs 101-105 varies according to signal strength of the antenna of the wireless communication device 50. In one example, none of the LEDs 101-105 may be lit when no signal is available, and all of the LEDs 101-105 may be lit when a maximum signal is acquired. Varying numbers of the LEDs 101-105 may be lit according to a variation in the signal acquired.

The light guiding element 20 comprises a plurality of guiding portions 201, each comprising an expander 203 having a first end 202 corresponding to a respective one of the light sources 10, and a second end 204 opposite to the first end 202. The second ends 204 of the expanders 203 of the guiding portions 201 collectively form the continuous end surface 24. At least one cavity 206 is defined between each two neighboring guiding portions 201.

Figure 6:
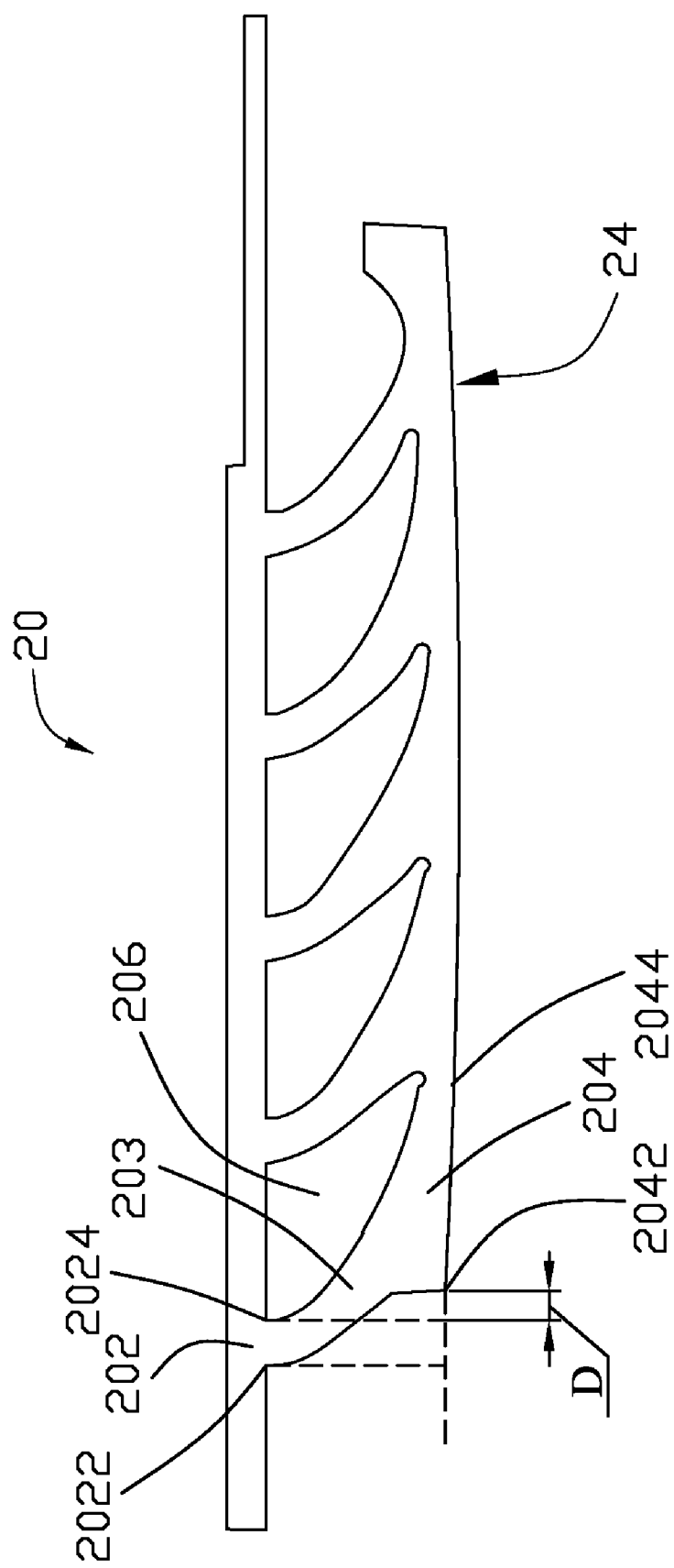
FIG. 6 is a schematic drawing of the light guiding element of FIG. 4.

In the illustrated embodiment of FIG. 6, a distance D between vertical projection of the first end 202 in the continuous end surface 24 and the second end 204 of each guiding portion 201 is greater than or about equal to zero. The first end 202 comprises a first edge 2022 and a second edge 2024. The second end 204 comprises a third edge 2042 and a fourth edge 2044. A distance between the first edge 2022 and the second edge 2024 is equal to the width of first end 202, and is less than a distance between the third edge 2042 and the fourth edge 2044, which equals the width of the second end 204. Each of the expanders 203 comprises two sides respectively extending from the first edge 2022 to the third edge 2042 and from the second edge 2024 to the fourth edge 2044, with the two sides curved. Alternatively, the two sides can be substantially planar.

The light shielding element 40 comprises at least one shielding portion 42 received in the at least one cavity 206 to prevent light interference between the plurality of guiding portions 201. When one or more of the light sources 10 is lit, the light portions of the light guide 20 transmit light from the light sources 10 to corresponding second ends 204. The light from one light source 10 is transmitted along a corresponding light portion to the continuous end surface 24, and the shielding portion 42 of the light shielding element 40 adjacent to the corresponding light portion prevents illumination of neighboring light portions.

The light guiding element 20 and the light shielding element 40 respectively comprise at least one fixing portion 21, 41 fixed to the wireless communication device 50. Alternatively, only the light guiding element 20 is fixed to the wireless communication device 50, and the light shielding element 40 is fixed to the light guide 20 by the shielding portions 42 to snugly match the cavity 206 of the light guide 20. The light shielding element 40 can also be integrally formed with the light guide 20 by an injection molding process, such as by filling shielding plastic material into the cavity 206 of the light guide 20 to form the shielding portions 42.

The light sources 10 are aligned in a substantially straight line in one embodiment. The continuous end surface 24 is rectangular and substantially parallel to the line formed by the plurality of light sources 10. Alternatively, the light sources 10 can be aligned along the circumference of a circle or in other shapes, accordingly, with the continuous end surface 24 of the light guide 20 being annular or having other shape.

The continuous end surface 24 is located in a hole defined in a shell of the wireless communication device 50, and is substantially coplanar with the outer surface of the shell, thus rendering the structure of the outer surface to be substantially flat. The light from the lit light source 10 is transmitted to the continuous end surface 24, and a continuous lighted area is displayed on the outer surface of the wireless communication device 50.

While exemplary embodiments have been described, it should be understood that they have been presented by way of example only and not by way of limitation. The breadth and scope of the disclosure should not be limited by the described exemplary embodiments, but only in accordance with the following claims and their equivalents.

What is claimed is:

1. A wireless communication device, comprising:
   a plurality of light sources; and
   a light guide comprising:
      a light guiding element comprising a plurality of guiding portions, each of the plurality of guiding portions comprising an expander having a first end corresponding to a respective one of the light sources and a second end opposite to the first end, wherein the second ends of the expanders collectively form a continuous end surface, and wherein at least one cavity is defined between each two neighboring guiding portions; and a light shielding element comprising at least one shielding portion received in the at least one cavity, to prevent light interference between the plurality of guiding portions.

2. The wireless communication device as claimed in claim 1, wherein a distance between vertical projection of the first end in the continuous end surface and the second end of each guiding portion is greater than or about equal to zero.

3. The wireless communication device as claimed in claim 2, wherein each of the expanders comprise two sides extending from the first end to the second end, wherein each of the two sides are curved.

4. The wireless communication device as claimed in claim 1, wherein the light sources are aligned in a line.

5. The wireless communication device as claimed in claim 4, wherein the continuous end surface of the light guide is rectangular and substantially parallel to the line formed by the plurality of light sources.

6. The wireless communication device as claimed in claim 1, wherein the light sources are aligned in a circle.

7. The wireless communication device as claimed in claim 6, wherein the continuous end surface of the light guide is annular and substantially parallel to the plurality of light sources.

8. A light guide for transmitting light from a plurality of light sources in a wireless communication device to an outer surface of the wireless communication device, comprising:

a light guiding element comprising a plurality of guiding portions, each of the plurality of guiding portions comprising an expander having a first end corresponding to a respective one of the light sources and a second end opposite to the first end, wherein the second ends of the expanders collectively form a continuous end surface, and wherein at least one cavity is defined between each two neighboring guiding portions; and a light shielding element comprising at least one shielding portion received in the at least one cavity, to prevent light interference between the plurality of guiding portions.

9. The light guide as claimed in claim 8, wherein a distance between vertical projection of the first end in the continuous end surface and the second end of each guiding portion is greater than or about equal to zero.

10. The light guide as claimed in claim 9, wherein each of the expanders comprise two sides extending from the first end to the second end, wherein each of the two sides are curved.

11. The light guide as claimed in claim 8, wherein the light sources are aligned in a line.

12. The light guide as claimed in claim 11, wherein the continuous end surface of the light guide is rectangular and substantially parallel to the line formed by the plurality of light sources.

13. The light guide as claimed in claim 8, wherein the light sources are aligned in a circle.

14. The light guide as claimed in claim 13, wherein the continuous end surface of the light guide is annular and substantially parallel to the plurality of light sources.

* * * * *